Figure 5:
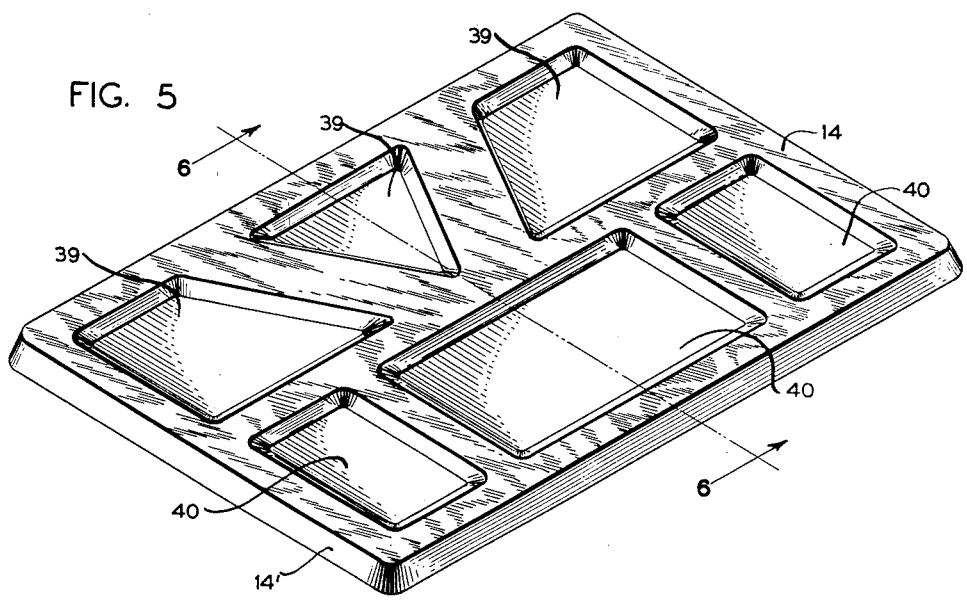

Jan. 13, 1953  S. F. REED  2,625,242
APPARATUS FOR HANDLING OF FOODS
Filed Feb. 5, 1947  2 SHEETS—SHEET 1
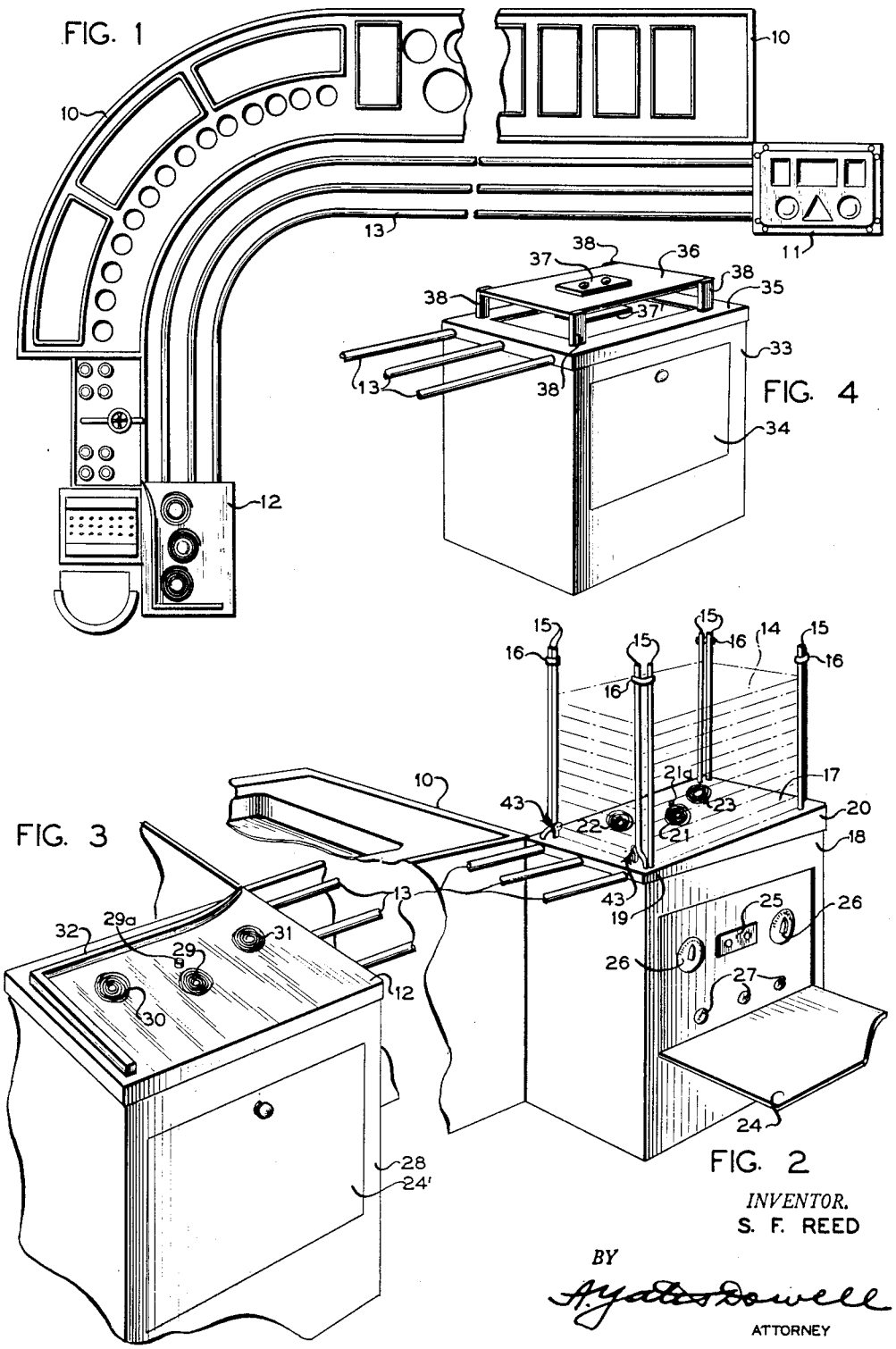
INVENTOR.
S. F. REED
BY
A. Yates Dowell
ATTORNEY Jan. 13, 1953     S. F. REED     2,625,242
APPARATUS FOR HANDLING OF FOODS
Filed Feb. 5, 1947     2 SHEETS—SHEET 2

INVENTOR.
S. F. REED
BY
A. Yates Dowell
ATTORNEY

Patented Jan. 13, 1953

2,625,242

UNITED STATES PATENT OFFICE 2,625,242

APPARATUS FOR HANDLING OF FOODS

Stanley F. Reed, Washington, D. C.

Application February 5, 1947, Serial No. 726,559

6 Claims. (Cl. 186—1)

This invention relates to the handling of materials under controlled conditions and among other things more particularly to improvements in the serving of hot and cold foods and beverages at their respective ideal temperatures suitable for consumption from the same serving element, and to the process and apparatus employed.

In the preparation, process and apparatus for the service of materials particularly in the nature of food, it has generally been the practice to dish the food onto cold platters or dishes directly from a bulk quantity which may be in either a heated or semi-heated condition. This heat, however, is soon dissipated by the relatively cold condition of the platter or dish. On the other hand, where special platters have been provided for keeping foodstuffs warm, as for example, by surrounding them with a specially constructed basin containing a heated medium, the construction of the trays or combination of trays is bulky and makes them impossible to handle in large quantities.

Accordingly, it is an object of this invention to provide an improved process and apparatus for handling materials, including the serving of foods, beverages, and the like, under controlled conditions, whereby the proper temperatures may be created, maintained or restored to a desired degree to the materials during their service.

It is a further object of this invention to provide a process and apparatus for the service of food on a compartmental tray maintained in a heated and relatively cool condition during the use thereof.

It is another object of this invention to provide an improved compartmental serving tray to be used cafeteria style, some of the compartments of which have heat applied without appreciable heat being supplied to other compartments of said tray so that the latter may contain food such as ice cream or the like in relatively cold condition.

Another object of this invention is to provide a method and apparatus for the serving of foods in cafeteria style whereby a portion of a compartmental service tray may be utilized for the preservation of heat in the service of hot foods and the preservation of cold in cold foods without material heat transfer.

An additional object of this invention is to provide a method and apparatus for the service of foods whereby hot foods may be put into heated and heat retaining compartments and cold foods into relatively cool compartments of the same tray.

Another object of this invention is to provide a method and apparatus for the service of hot and cold foods on a compartmental tray whereby the foodstuffs to be maintained in a heated condition may be subsequently warmed without affecting the relatively cold condition of other foodstuffs on the same tray.

Figure 6:
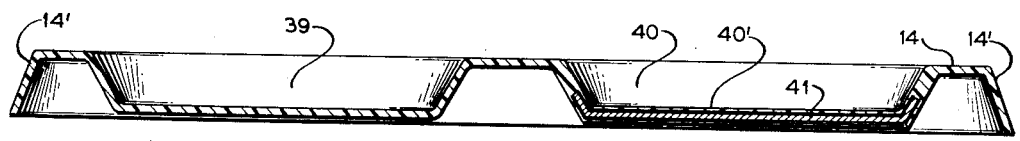
Figure 7:
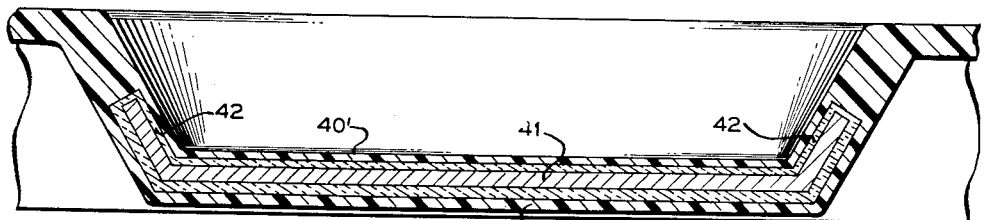
Figure 8:
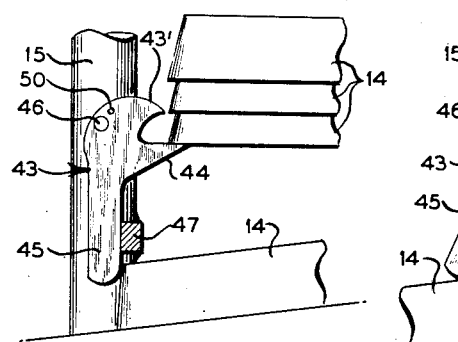
Figure 9:
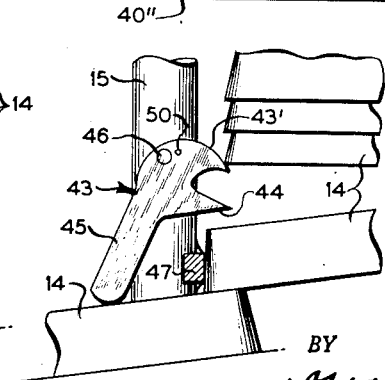

Further objects, advantages, uses, and adaptations of the invention will be apparent from the following description taken in conjunction with the accompanying drawings having like parts similarly indicated, wherein:

Fig. 1 is a top plan view of a service counter arrangement for use in the present invention;

Fig. 2, a perspective view of one end of the counter arrangement;

Fig. 3, a perspective view of the opposite or discharge end of the counter arrangement;

Fig. 4, a perspective view of a modified form of counter usable in lieu of one or both of those shown in Figs. 2 and 3;

Fig. 5, an isometric view of a compartmental tray;

Fig. 6, a cross-sectional view of Fig. 5 on the line 6—6;

Fig. 7, an enlarged view of a portion of Fig. 6;

Fig. 8, a front plan view of a tray holder and dispenser;

Fig. 9, a front plan view of the tray holder and dispenser in operation; and

Figure 10:
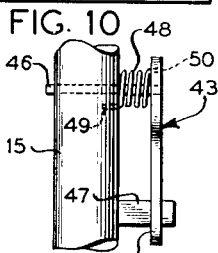

Fig. 10, a rear view of the tray holder and dispenser.

Generally stated the feeding or serving of hot foods to large crowds, patients in hospitals, sanitariums, and the like, has been and is an increasingly difficult problem. Applicant by his arrangement and apparatus as illustrated herein provides a new technique and means of heating or warming and serving of large quantities of food with the retention of their ideal state for consumption. The maintenance of the palatability of food has likewise a particular significance in military establishments or the like where individuals are served in cafeteria style by other than their own choice. Further, this method of serving food is more efficient and economical, requiring less help than is the ordinary case with the use of individual dishes. Likewise, the advantages of rapidly serving foods to a great number of persons other than in the usually cold dish or tray without heat therein or food heat retaining properties will be readily recognized and appreciated.

Referring to Fig. 1 of the drawings, serving counter 10 of conventional design found in cafeterias over which food is served to patrons passing along the counter has a serving tray rack attachment 11 at one end and a tray receiving attachment 12 at its opposite end with tray supports or railings 13 therebetween along which the trays are adapted to be slid during the filling thereof.

In Fig. 2, the tray and attachment illustrated at 11 in Fig. 1 comprises tray elements 14 supported at their corners by pairs of uprights or rods 15. These rods 15 may be secured by welding cross pieces 16 as illustrated, or substituted for by angle irons or other holding means of any suitable design, for supporting the corners of a stack of serving trays. This framework comprising uprights 15 is mounted on base 17 which is in turn supported on cabinet 18. The base 17 is of gradually increased thickness throughout its length from the side 19 to 20 and thereby serves to raise one side of the tray when it is placed on base 17 to permit it to slide more easily from alignment with the tray stack onto the railings or tray guideways 13 without the use of undue force by a patron serving himself in the manner as will be hereinafter described. Positioned on the base 17 are radio frequency radiating elements or antennae 21, 22 and 23, which may also be termed induction heater elements, for use in heating the compartmental tray 14 in the manner as herein described.

On the front of cabinet 18 is shown a pivoted closure member 24 adapted to shut off from public manipulation and view the conventional switch member 25, dial controls 26, and meters 27. As disclosed, the induction heater, radiating element or antenna 21 is slightly offset from alignment with similar elements 22 and 23 to locate these elements with respect to the heating elements of tray members 14 in the manner as will be hereinafter described. The heating effect of these elements 21, 22 and 23 is of course controlled by a presetting of the apparatus through its control members 26. This setting will be made in accordance with well known principles of heating by inductive and di-electric means and the degree of heat required to be induced to secure suitable and desired temperatures in one or more elements placed in the field set up by the apparatus.

The cabinet 18 contains a conventional electrical heat inducing unit of the induction or di-electric type. As shown in the preferred illustration, the nature of the heating employed is one wherein high frequency currents are caused to pass through the induction heaters, radiating coils or antennae 21, 22 and 23, inducing or causing heat to be created in materials, placed thereon or brought into contact with the electrical field created thereby, in a manner of seconds. Inasmuch as this type of heating is well known, the details of construction and principles of operation are not shown specifically but are briefly described in order to facilitate a full understanding of the nature and operation of the apparatus.

The cabinet 18 houses a vacuum tube oscillator which might be considered in the nature of a radio transmitter since the frequency at which this oscillator operates is in the radio frequency range and is usually some value above 1 (one) megacycle. The cabinet 18 also contains a high voltage power supply for the plates of the vaccuum tubes as well as a low voltage power supply for the filaments thereof, and in most applications this oscillator would be adapted to operate from the conventional 110 volt 60 cycle A. C. electrical supply.

The oscillator employed may be any of the several well-known types of self-excited oscillators and in order to dissipate the energy developed in the oscillator in an efficient manner and to apply this energy at the desired points, namely, certain compartments of the food service tray 14 which is adapted to be positioned adjacent the top of the cabinet 18, there are provided radio frequency radiating elements 21, 22, and 23 which are in the nature of antennae coupled to the output circuit of the oscillator in a manner to transfer the R. F. energy from the output circuit to the radiating elements. The R. F. energy radiated by these elements induces electric current in metallic articles interposed in the field thereof, the flow of these currents inducing heat therein, or in another form the R. F. current passes through a di-electric space which may be either air or other relatively non-conducting material, and in attempting to pass through this non-conducting medium, heat is generated which in turn is dissipated throughout the medium. It will thus be seen that in using this heat inducing device a food serving tray or the like having metal plates embedded therein at appropriate locations (as hereinafter described) when brought into the R. F. field of the radiating elements will result in heat being induced in these plates, and further if the tray is brought into such a field after the deposition of food thereon, heat may also be induced in the food itself due to the di-electric characteristics thereof, thus resulting in a dual heating effect.

Since the specific design of the oscillator and its associated components forms no part of this invention but may be of purely conventional design, it is not considered necessary to include a further detailed description thereof.

With reference to Fig. 3, the tray receiving end 12 comprises a cabinet 28 similar in design, construction and operation to cabin 18 of Fig. 2 with a cabinet door 24' in closed position. The top element of cabinet 28 comprises a tray receiving member as has been designated by the numeral 12 in which are induction heaters, radiating elements or antennae 29, 30 and 31, and a switch member 29a similar in arrangement and operation, with respect to an object placed thereon or in contact therewith, to the antennae elements 21, 22 and 23, and switch member 21a of Fig. 2. A tray stop and guide member 32 is provided on tray receiving member 12. The operations of the tray delivering and tray receiving elements 11 and 12 with respect to tray 14 will be hereinafter described.

Fig. 4 is a modified form of induction heater usable instead of the type shown in Fig. 2 and Fig. 3 and comprises a cabinet 33, with a closed door 34, upon which is placed a tray support 35. Positioned centrally and located above support 35 is a plate 36 illustrating a cold heater, radiating unit or antenna 37, one or more of which may be used and placed about the plate 36 as desired, the plate 36 being supported at its ends by suitable legs 38. The tray support or guideway elements 13 shown as positioned to the left of cabinet 33 may be positioned on either or both sides of the cabinet for feeding tray elements into the space provided between the plate 36 onto the tray support member 35. The tray support member 35 also carries one or more induction heater units 37' similar to and opposite to element 37. The space provided between the plate 36 and tray support 35, in the area, for example, of the induction heater 37 and its opposite antenna, is adapted to provide a di-electric zone of a conventional design in which heat inducing currents are adapted to be set up in an object placed therein and as an embodiment of this invention is better adapted to be substituted for the tray receiving element 12 (of Fig. 1) when the contents of the tray or the heat retaining elements of the tray are to be subjected to localized warming or heating. However, where a tray stand or rack support 11 without the heretofore described preferred type of heating element used thereunder is placed adjacent one side of the cabinet, the empty tray may pass through the field for preliminary or localized heating of the tray element for the purpose and in the manner as herein described.

Fig. 5 comprises a compartmental tray element 14 preferably molded or formed of plastic or non-heat conductive material containing a plurality of compartments 39 and 40. These tray elements 14 are simple in design, light in weight and of standard size, facilitating convenience of handling, stacking and delivery.

The detailed view in Fig. 6 illustrates the light weight construction of the tray which comprises the tray body 14 with down-turned outwardly flared flanges 14' to facilitate stacking, delivery and carrying, and compartmental elements 39 and 40. The compartment 40 as shown in cross section has secured in its bottom 40' an insert element 41. This insert element is of metallic construction, such as copper or steel, having heat retaining properties and properties which enable it to be almost instantaneously heated by induction or di-electric heating when placed in respective fields created, for example, by the heretofore described current inducing electrical cabinets 18, 28 and 33 with their respective cold heat units, radiating elements or antennae 21, 22, 23, 29, 30, 31, 37 and the unit contained in support 35, respectively.

The disclosure of Fig. 7 comprises a more detailed illustration of the tray compartment 40 containing insert element 41 sorrounded by a body of heat insulating material 42. The element 41 is shaped at its ends to conform to the contour of the compartment 40 and a somewhat lesser quantity of insulating material 42 lies between the element 41 and bottom 40' of compartment 40 than is shown on its opposite side adjacent the outside edge or base 40" of the compartment 40. This thicker layer of insulating material adjacent the extreme bottom side 40" serves to retain the heat created in compartment 40, when the tray portions containing the metal insert are subjected to induced or di-electric currents in the manner as herein illustrated.

The illustration disclosed in Fig. 8 comprises one of the tray restraining and delivering elements 43 which is in the nature of an escapement adapted to support a stack of trays on extended lip 44 and a single tray on support 17 (of Fig. 2) by handle 45. This tray ejecting and supporting means 43 is attached to upright 15 at pivot point 46. A tray bumper or guide 47 is attached to upright 15 and serves to guide and prevent a forward motion of the tray in its downward movement from the stack, it being the normal tendency of the tray as it falls to rest on the tray immediately under it which is in a forward sliding position when it rests on supporting member 17. The curved edge 43' with its pointed tip is adapted to clear the tray stack when tray ejector means 43 is in holding position as illustrated in this figure. By reference to Fig. 2, it will be noted that there are two tray ejecting and holding means 43 and that they are attached to uprights 15 in such manner as to permit a patron operator to release the trays as needed. The release of one tray at a time is accomplished by sliding the bottom tray against release members 43 where it projects from the tray stack arrangement and can then be pulled or pushed from thereunder.

There is disclosed in Fig. 9 the tray ejector 43 in operative ejecting position wherein the tray 14 which rests against the ejector handle 45 and being in a downwardly sloping position slides forward, and the next adjacent tray being released, by holding point 44, drops down as the point of curved edge 43' moves forward to contact and support the balance of the stack of trays 14. As will be noted the tray stop member 47 positions the tray 14 released from the stack and restrains it from sliding forward. In the event that the dropped tray 14 does slide forward when it has fallen, the relatively light weight of the tray and the angular shape of tray side 14' permits handle 45 to reposition it on the tray supporting member 17 over heating elements 21, 22 and 23 (disclosed in Fig. 2) for the purposes as herein described.

In Fig. 10 means is shown for attaching the the tray ejector and supporting means 43 to upright 15 comprising a pivotal pin 46 and spring means 48. This spring means comprises a coil spring having one end 49 secured by upright 15 and its opposite end 50 secured in tray ejector means 43 and under tension counter-clockwise, normally tending to keep the tray ejector handle 45 of tray ejector means 43 in tray restraining position as disclosed in Fig. 8. That is, the pressure of the spring 48 is sufficient to resist an opening or tray freeing movement of tray ejector means 43 caused by the combined weights of the tray stack on point 44 and the single tray against handle 45 but permits operation by a patron who desires to release one tray at a time.

In order to illustrate the purpose and advantages of this device and its associated working parts, the following will describe one operation of the use of the apparatus. During a tray serving operation, the person or patron being served pushes or pulls a heated tray forward against the tray ejector means 43, as heretofore described, to permit a tray 14 to slide forward on the forwardly sloping support 17 onto tray rails 13 whereat he may be served from the counter a number of hot and cold foods as desired, in the proper tray elements presumed to be known by the persons behind the counter and as shown in a preferred arrangement with the hot compartments 40 which are the compartments on the inside of the serving rails 13 where they coincide with the respective inductive fields or antennae of the supporting cabinet 18, 28 and 33 for localized intermittent heating of the nature as herein described either prior to filling or after filling or both as the case may be. When the tray is filled it is moved forward along the tray rail 13 to the tray receiver and supporting means 12 where the tray element 14 by reason of its compartmental arrangement aligns compartments 40 and insert elements 41 in the fields created by respective radiating elements or antennae 29, 30 and 31. By this latter arrangement, it is of course understood that the tray elements are heated after the food is placed therein. However, as heretofore indicated, the heating element arrangement may be initiated at the start of the tray along its course or placed adjacent thereto or in alignment therewith in order to provide a heating effect to one or more compartments receiving hot foodstuff.

In cases where the apparatus disclosed in this application would be subjected to intermittent use, such as during intervals between the conventional meal periods in a restaurant or cafeteria or in any case where there is likely to be infrequent service to patrons, it might be considered advantageous to employ some means whereby the radiating elements of the heat inducing means would be deenergized during these periods, both in order to save consumption of electricity and also to preclude accidental and continued or detrimental heating of the trays or other objects which might inadvertently be placed within the field of such radiating elements.

For this purpose an automatic control circuit will be associated with the oscillator or heat inducing apparatus and the incorporation of such a circuit is considered to be within the scope of this invention. Such a circuit conveniently takes the form of a timing mechanism to control the application of high voltage to the plates of the oscillator tubes, this time mechanism to be operated by a solenoid, the solenoid in turn to be energized and de-energized by a switch located in the path of the service trays to be actuated by such a tray when deposited on the tray support adjacent the radiating elements and within the R. F. field to be created thereby. It will thus be seen that by this simple control circuit arrangement, the objects mentioned above will be attained and that further there is no danger to patrons or others in that none of the high voltage circuits of the oscillator or heat inducing apparatus are located where they might constitute a hazard to persons either utilizing the trays or servicing and cleaning the apparatus.

It will, of course, be understood that different arrangements of compartments may be provided with cooperatively associated induction heating areas, radiating elements or antennae, and likewise that the use of particular features of this apparatus may be utilized or incorporated under a variety of conditions and uses. Further that in utilizing this apparatus in the manner as described, that one or more of the heating units may be used in the same installation as may be required for convenience or efficiency.

It will be obvious to those skilled in the art that various changes may be made in the invention without departing from the spirit and scope thereof and therefore the invention is not limited by that which is shown in the drawings and described in the specification but only as indicated in the appended claims.

What is claimed is:

1. Food dispensing apparatus comprising a series of sections, a stack of compartmental serving trays, certain of said compartments having portions thereof which absorb heat from induction heating means, a rack for supporting said trays, an induction heating cabinet supporting said rack, a tray receiving support, guiding and supporting means between said rack and said tray receiving support, means associated with said tray rack for mechanically delivering one tray at a time to said guiding and supporting means, said induction heating cabinet including an electrical unit adapted to create a relatively high frequency electrical field at its upper portion in which a tray may be disposed, and said tray-receiving support also including an electrical unit for creating a relatively high frequency electrical field.

2. Apparatus for delivering heated serving trays comprising a stack of compartmental serving trays, certain of said compartments having portions thereof which absorb heat from induction heating means, a rack for supporting said trays, a tray support, means associated with rack for mechanically delivering one tray at a time to said tray support, and said tray support including an electrical unit for establishing a relatively high frequency electrical field in the area of its top portion, said field being adapted to induce heating in said serving tray when said tray is delivered thereto.

3. A food dispensing apparatus comprising a series of food dispensing sections, a compartmental serving tray, certain of said compartments having portions thereof which absorb heat from induction heating means, a guide rail adjacent the front side of said food dispensing sections and associated with said serving tray, and electrical means associated with said track guideway for creating an electrical field for providing induction heating through which said serving tray passes.

4. A food serving apparatus comprising a tray pre-heating station, said station including a tray rack, trays having portions thereof made of material which may be heated by induction heating and other portions which would be substantially unaffected by induction heating, mechanical means for ejecting a tray, tray supporting means including an electrical unit adapted to supply a relatively high frequency electrical field adjacent said mechanical tray ejecting means, a tray guideway leading from said pre-heating station, and tray receiving and supporting means on the opposite end of said guideway, said tray receiving and supporting means including an electrical unit adapted to supply a relatively high frequency electrical field to said tray receiving and supporting means for further heating a tray thereon.

5. A food serving system comprising a base for supporting a tray, means supported in fixed relation to said base for locally heating certain portions only of said tray, guide means for supporting trays extending from said base past food-serving sections, a tray-receiving member positioned in spaced relation to said base, said guide means extending from said base to said tray-receiving member, and means supported in fixed relation to said tray-receiving member for locally heating the said certain portions only of said tray.

6. A cafeteria system comprising means for supporting a stack of food retaining trays, a series of food dispensing sections, means for guiding the trays as they are moved from the stack supporting means past the food dispensing sections, each tray having portions which may be heated by induction heating and other portions which are not substantially affected by the induction heating means, and a plurality of induction radiators through whose fields the trays pass as the trays are moved past the dispensing sections.

STANLEY F. REED.

REFERENCES CITED

The following references are of record in the file of this patent:

UNITED STATES PATENTS

| Number | Name | Date |
|---|---|---|
| 932,242 | Berry | Aug. 24, 1909 |
| 972,649 | Rose | Oct. 11, 1910 |
| 1,049,385 | Mohrenwitz | Jan. 7, 1913 |
| 1,398,867 | Lauth | Nov. 29, 1921 |
| 1,411,432 | Henderson | Sept. 9, 1922 |
| 1,624,267 | Lyndon et al. | Apr. 12, 1927 |
| 1,677,276 | Deicken | July 17, 1928 |
| 1,722,043 | Hill | July 23, 1929 |
| 1,809,951 | Vilfordi | June 16, 1931 |
| 2,336,670 | Cavicchioli | Dec. 14, 1943 |